March 3, 1942.    M. H. RHODES    2,274,635
TIMER
Filed Aug. 2, 1940    2 Sheets-Sheet 1

Marcus H. Rhodes
Inventor
Haynes and Koenig
Attorneys

March 3, 1942.  M. H. RHODES  2,274,635
TIMER
Filed Aug. 2, 1940  2 Sheets-Sheet 2

Marcus H. Rhodes
Inventor
Haynes and Koenig
Attorneys

Patented Mar. 3, 1942

2,274,635

UNITED STATES PATENT OFFICE 2,274,635

TIMER

Marcus H. Rhodes, Hartford, Conn., assignor to M. H. Rhodes, Inc., Hartford, Conn., a corporation of Delaware Application August 2, 1940, Serial No. 349,682

6 Claims. (Cl. 161—23)

This invention relates to timers, and more particularly to timers which carry out one or more operations at a predetermined time.

Among the objects of the present invention is the provision of a timer which gives a signal at the termination of a predetermined time; the provision of a timer, which, at the end of a predetermined time, will carry out an operation, such as cutting a current, giving an alarm, or both; the provision of a timer which may be adjusted to measure a large variety of predetermined periods of time at will; and the provision of a timer which may be adjusted to carry out a given operation, during an indefinite period of time, and then operated to continue carrying out the operation over a predetermined period of time. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are illustrated several of various possible embodiments of the invention, Fig. 1 is a front elevation partially in section of one form of the invention;

Similar reference characters indicate corresponding parts throughout the several views of the drawings.

Figure 1:
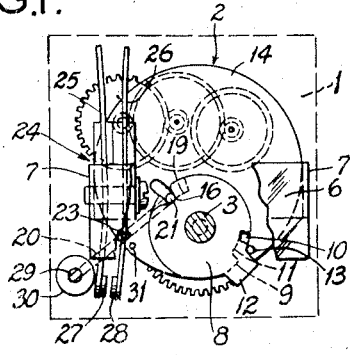
Figure 2:
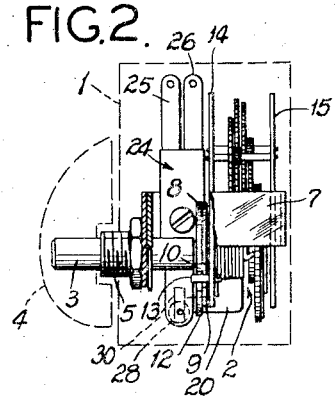
Fig. 2 is a right end elevation of the Fig. 1 embodiment.

The present invention relates to center-stud mounted timing devices such as shown and described in Patent No. 2,194,448 to the present applicant. Such timing devices, upon the termination of a predetermined period of time, deliver a signal, such as by striking a bell, to indicate that the time has elapsed. The timers of the present invention, however, not only deliver an audible signal, such as striking a bell, but also carry out an additional act, such as cutting a current or the like.

Referring now to the drawings, the timing mechanism may be mounted upon any suitable frame, shown generally at 1. A time-measuring device of any of the customary clockwork types may be employed, which in general embodies a gear train and a means for storing energy, such as a spring. This is represented at 2. Winding and actuating shaft 3 carries a knob 4 for the dual purpose of accomplishing the winding and actuating operation, and serving as a pointer to show what amount of the predetermined time remains. This shaft 3 is driven by the clockwork mechanism, and is preferably mounted in a housing 5 on case 1. The clockwork itself is preferably mounted on a framework, such as bars 6 and 7 and plates 14 and 15. The shaft 3 has mounted thereon two plates 8 and 9, located adjacent to each other. Plate 8 is mounted firmly upon shaft 3, while plate 9 is rotatably mounted thereon. A projection 10, which may be formed from the plate itself, projects downwardly from plate 8, to cooperate with slot 11 in plate 9. Plate 8 likewise has a cam 12, which cooperates with a pin 13, attached to the frame mounting, in this case plate 14, to prevent rotation of shaft 3 in the wrong direction and also to stop the clockwork mechanism upon the expiration of the predetermined time.

It will be noted that plate 8 is provided with a notch 16, one side of which 17 is substantially perpendicular, while the other side 18 is slanting. Plate 9 is likewise provided with a notch 19, both sides of which are perpendicular. Cooperating with these notches 16 and 19 is member 20, having a portion 21 located thereon. Member 20 is mounted on plates 14 and 15, by means of projections 23 and 22, respectively.

Mounted on bar 6 is a circuit-controlling assembly 24. Assembly 24 comprises two spring members 25 and 26, carrying at their ends electrical contact buttons 27 and 28. Members 25 and 26 are normally positioned so that their springing action maintains contact buttons 27 and 28 separated. Member 20 carries at the end opposite the portion 21 a projecting portion 29, with an insulator 30 attached.

The operation of the device is as follows:

Fig. 1 illustrates the position of the mechanism when the timer has completed the operation of measuring the predetermined time, and has stopped. It will be noted that contact buttons 27 and 28 are separated, and that the portion 21 of member 20 occupies the slots 16 and 19 in plates 8 and 9. In this position insulator 30 exerts substantially no pressure upon spring 25 although it is located adjacent thereto. If the pointer 4 mounted upon shaft 3 is now rotated, carrying with it shaft 3, the plates 8 and 9, and winding the clockwork mechanism, the portion 21 of member 20 rides up over the gradual incline in slot 16, indicated at 18, and is substantially completely out of the slots 16 and 19 before projection 10 cooperates with slot 11 in plate 9 to begin rotation of plate 9. Projection 21 is then clear of the vertical edge of slot 19. The moving of member 20 by this operations, brings insulator 30 into contact with spring 25, and forces the contact button 27 into contact with button 28, thus closing a circuit. Rotation of the knob 4 may then be continued to the desired extent to mark out a predetermined period of time. To aid in this setting operation, a pin 31 may likewise be positioned upon plate 14 to prevent rotation of the assembly beyond a predetermined point. Pin 31 will contact cam 12 when the predetermined point has been reached, thus preventing further rotation.

Figure 3:
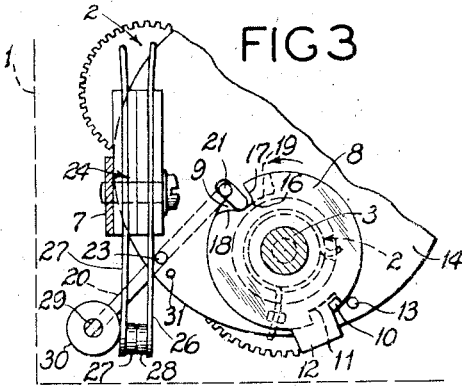
Fig. 3 is an enlargement of the lower left portion of Fig. 1, showing the mechanism in a different position.
Figure 4:
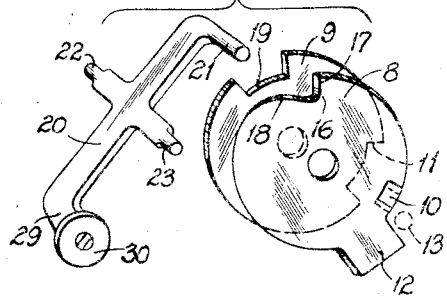
Fig. 4 is an enlarged view of parts of the operating mechanism of the Fig. 3 embodiment.

If knob 4 is now released, the clockwork mechanism which has been wound by the previous operation will now operate the device, rotating plate 8 in the opposite direction. It will likewise serve to rotate plate 9 as soon as projection 10 cooperates with slot 11 for this purpose. Plate 9 lags behind plate 8, both in the winding and setting operation, and in the subsequent timing. Thus the slanting portion 18 of notch 16 on plate 8 is reached by projecting portion 21 before the corresponding vertical side of slot 19 is reached. This is shown particularly in Fig. 3. Projection 21 then is retained in position by plate 9 until subsequent rotation of plate 8 has carried plate 9 far enough so that portion 21 drops over the vertical edge of slot 19 and into the Fig. 1 position. This occurs with a snap-action, since the edge of slot 19 is substantially vertical. The dropping of projection 21 releases the tension upon springing member 25, which was imparted through insulator 30. Member 25 then operates to separate contact buttons 27 and 28, likewise with a snap-action. It will be understood of course, that it is the tension in springing member 25 which forces portion 21 into slot 19 as soon as the edge thereof has been reached, thus separating the contacts.

Figure 5:
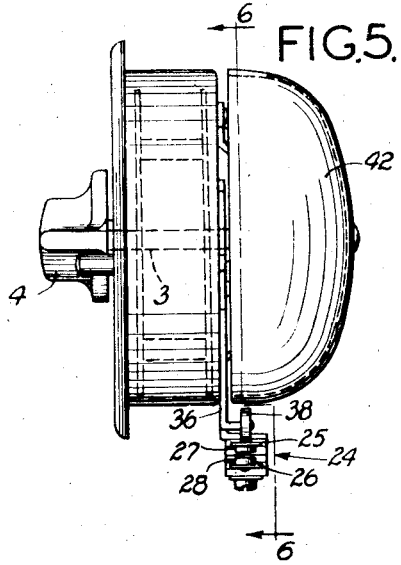
Fig. 5 is a side elevation of an alternative embodiment of the invention.
Figure 6:
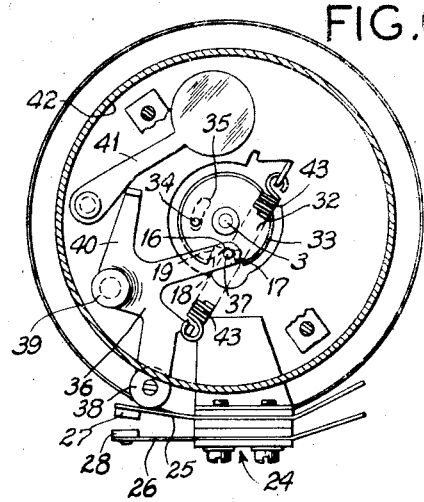
Fig. 6 is a section taken along the line 6—6 in either Fig. 5 or Fig. 9.
Figure 7:
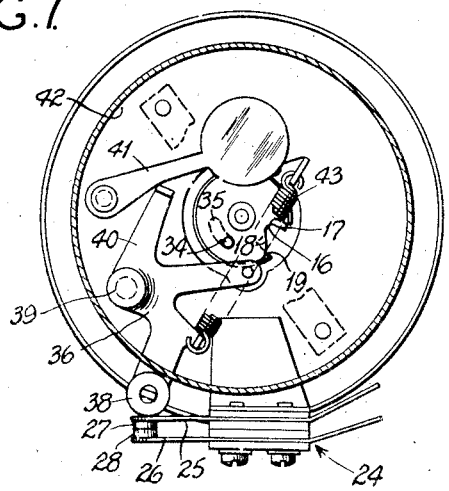
Fig. 7 is a section similar to Fig. 6, but showing a different position of the mechanism.

An alternative embodiment is shown in Figures 5, 6 and 7. The mechanism is similar to that shown in the previous embodiment, but plates 32 and 33 are connected by a pin 34 attached to plate 32, which cooperates with a slot 35 located in the central portion of plate 33. Member 36, which cooperates with plates 32 and 33, is provided with a pin 37 which cooperates with the slots in plates 32 and 33. These slots are similar in form to those in the previous embodiment. Member 36 is provided with an insulator 38, as shown, for closing the contacts 27 and 28 by imposing tension upon springing member 25. Member 36 is mounted on rivet 39, and has a portion 40 adapted to cooperate with a hammer 41 and strike a bell 42.

A spring 43 is likewise provided to assist in the operation of member 36.

The operation of this embodiment is as follows:

Plates 32 and 33, which are mounted upon shaft 3 as before, are rotated by means of pointer 4, during which time the clockwork mechanism is being wound. Pin 37 is lifted out of the slots in plates 32 and 33 as the winding operation is begun, thus tensioning spring 43, as well as member 25, and closing contacts 27 and 28. Portion 40 is likewise retracted to deliver a blow through the hammer 41. Rotation of the shaft 3 by knob 4 is discontinued when the desired time has been set. Thereupon the clockwork mechanism begins rotation of the shaft 3 assembly in the opposite direction. Plate 33 lags behind plate 32 for the reasons outlined in connection with the previous embodiment, but upon the pin 37 reaching the vertical edge of the slot in plate 33, the spring 43 and springing member 25 snap member 36 into the Fig. 6 position. Fig. 7 illustrates the position of the mechanism shortly before this takes place. When this occurs, the tension in member 25 separates the contacts, while the motion of the member 36, particularly of its portion 40, imparted both by the spring 43 and by the member, 25, causes part 40 to strike hammer 41, which in turn strikes bell 42 to cause the desired signal.

Accordingly upon the expiration of a predetermined period of time, which may be varied widely by discontinuing winding the knob 4 at any desired point, an audible signal is given by the hammer 41 striking bell 42, and at the same time the circuit is broken by the separation of contacts 27 and 28.

Figure 8:
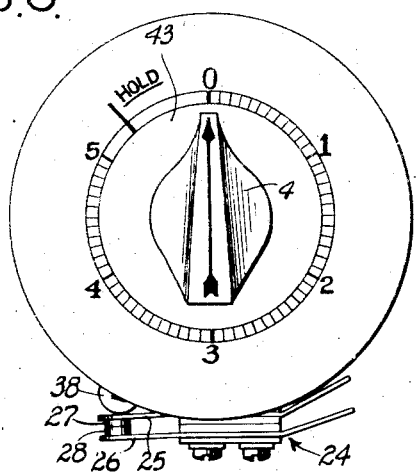
Fig. 8 is a front elevation of an alternative embodiment of the invention.
Figure 9:
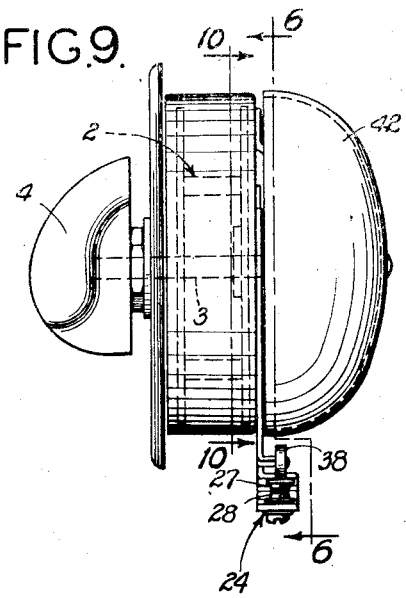
Fig. 9 is a right end elevation of the Fig. 8 embodiment.
Figure 10:
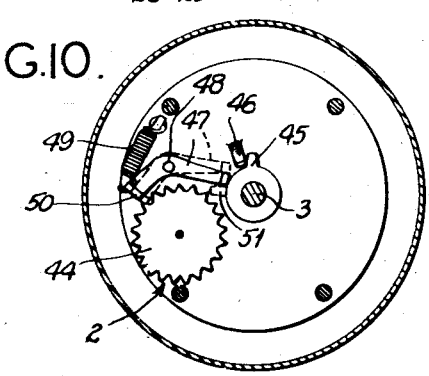
Fig. 10 is a section taken along the line 10—10 on Fig. 9.

A still further embodiment is illustrated in Figures 8, 9 and 10. The dial in this instance, instead of merely having figures thereupon, as would be the case with the previous embodiments, also has a segment illustrated at 43. This is marked "Hold" for reasons which will become clear as the mechanism is described. As is indicated by the section line 6—6 on Fig. 9, a view taken along this line on the embodiments of Figures 8, 9 and 10 will be identical with Fig. 6. The circuit making and breaking apparatus, the plates 32 and 33, and associated mechanism, including the hammer 41, bell 42, etc. are in every way analogous. However, the Fig. 8-10 embodiment incorporates an additional feature shown particularly in Fig. 10. The clockwork mechanism 2 includes an escapement wheel 44. Mounted upon shaft 3 is cam member 45, which is rotatable therewith. Cam 45 cooperates with a stop 46 attached to plate 15, to function as pin 31 does in the Fig. 1 embodiment. Also attached to plate 15 is arm 47, which may be mounted thereon as by a pin 48. A spring 49 positions arm 47 against cam member 45, and prevents the portion 50 of arm 47 from contacting escapement wheel 44. Portion 50, it will be noted, projects so as to be able to contact the escapement wheel 44. Rotation of shaft 3 and cam member 45 from the solid-line position, to the dotted-line position 51, brings cam 45 into contact with member 47. Continued rotation brings the portion 50 of member 47 into contact with escapement wheel 44, as shown in dotted lines, thus stopping the mechanism. Rotation of cam member 45 back in the opposite direction, however, releases member 47 and lets spring 49 lift member 47 and bring the portion 50 out of contact with escapement wheel 44.

From the foregoing it will be apparent that rotation of shaft 3 sufficiently far so that cam 45 passes the 51 position, will operate to stop the clockwork mechanism. The pointer 4 will in this instance be in the region 43 of the dial which has been denominated "Hold." Although the clockwork mechanism is stopped at this point, the contacts 27 and 28 are closed, since pin 37 is out of the slots in plates 32 and 33. Inasmuch as the clockwork is not operating, the contacts will remain closed, and pointer 4 will remain in the "Hold" area indefinitely until moved therefrom by hand to a position where cam 45 will permit spring 49 to release the escapement wheel 44.

From the foregoing it will be clear that the present invention provides a timing mechanism adapted to measure a wide variety of predetermined times, and at the end of said times to operate an audible signal, and likewise to carry out an additional operation, such as breaking a circuit. In addition, a timing mechanism of this type has been disclosed which may be placed in a position where it will remain potentially operative over an indefinite period, and will maintain a circuit closed, but will require manual initiation of a subsequent predetermined period of operation.

It will be understood that pointer 4 cooperates with a suitable scale to tell at all times the extent of the unexpired portion of the predetermined period. The clockwork mechanism is selected to provide the proper range of times from which to choose. The greater the range from which to choose, however, the less accurate can be the setting of pointer 4, as is true of any dial setting.

The selection of a period of time on the device of the present invention is not irrevocable. The period may be extended, decreased or terminated at any time, merely by moving pointer 4 to the appropriate position. Pointer 4 is connected directly to the energy-charged means (e. g., a spring) and rotates with it so that the energy-storing mechanism is directly responsive to the pointer.

When further rotation of the shaft 3 assembly, including pointer 4, is prevented as by pin 13 or stop 46, the clockwork mechanism stops, since, as was pointed out, pointer 4 and shaft 3 are connected directly to the energy-storing means.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. A timing mechanism comprising clockwork, a main shaft therefor, means for rotating said shaft and winding the clockwork, a pair of contacts one of which is resilient and normally tends to move away from the other, a pivotally mounted arm adapted to move the resilient contact into contact with the other as it moves in one direction about its pivot, and a pair of slotted discs on said shaft one of which may rotate relative to the other as the shaft turns, a part of said arm normally resting in said slots and adapted to be forced out of said slots as the clockwork is wound and close said contacts and to reenter said slots at the end of a predetermined time and allow the contacts to separate.

2. A timing mechanism as set forth in claim 1, including a casing in which the aforesaid parts are positioned and a bell supported on said casing adapted to be sounded on movement of said arm.

3. A timing mechanism as set forth in claim 1, in which said means for rotating the shaft includes a pointer, and a dial with which said pointer coacts.

4. A timing mechanism comprising a housing, clockwork therein, a main shaft therefor, a pointer handle for rotating said shaft and winding the clockwork, a dial with which the pointer coacts, a pair of electrical contacts one of which is resilient and normally tends to move away from the other, a pivotally mounted arm adapted to move the resilient contact whereby it engages with the other as it moves in one direction, and a pair of slotted discs on said shaft one of which may rotate relative to the other as the shaft turns, a part of said arm normally resting in said slots and adapted to be forced out of said slots as the clockwork is wound and close said contacts and to reenter said slots at the end of a predetermined time with a snap action and allow the contacts to separate.

5. A timing mechanism as set forth in claim 4, including an audible signal actuated as the contacts move in one direction.

6. A timing mechanism as set forth in claim 4, including an audible signal actuated as the contacts move in one direction, said signal including a bell covering the front of the housing and a striker within the bell and coacting with said arm.

MARCUS H. RHODES.